United States Patent
Akgiray

(10) Patent No.: US 9,594,857 B2
(45) Date of Patent: Mar. 14, 2017

(54) METHODS FOR DESIGNING QUADRUPLE-RIDGED FLARED HORN ANTENNAS

(71) Applicant: CALIFORNIA INSTITUTE OF TECHNOLOGY, Pasadena, CA (US)

(72) Inventor: Ahmed H. Akgiray, Istanbul (TR)

(73) Assignee: California Institute of Technology, Pasadena, CA (US)

( * ) Notice: Subject to any disclaimer, the term of this patent is extended or adjusted under 35 U.S.C. 154(b) by 614 days.

(21) Appl. No.: 14/106,591

(22) Filed: Dec. 13, 2013

(65) Prior Publication Data

US 2015/0019179 A1 Jan. 15, 2015

Related U.S. Application Data

(60) Provisional application No. 61/846,510, filed on Jul. 15, 2013.

(51) Int. Cl.
*G06F 17/50* (2006.01)
*H01Q 13/02* (2006.01)

(52) U.S. Cl.
CPC .......... *G06F 17/5009* (2013.01); *G06F 17/50* (2013.01); *H01Q 13/0275* (2013.01); *G06F 2217/08* (2013.01)

(58) Field of Classification Search
None
See application file for complete search history.

(56) References Cited

U.S. PATENT DOCUMENTS

| 5,719,794 A * | 2/1998 | Altshuler ............... G06F 17/50 703/1 |
| 2003/0229861 A1 * | 12/2003 | Quigley ................. G06F 17/50 716/102 |
| 2005/0231436 A1 * | 10/2005 | McLean ............ H01Q 13/0275 343/786 |

OTHER PUBLICATIONS

Dehdasht-Heydari et al., "Quad Ridged Horn Antenna for UWB Applications", Progress in Electromagnetics Research, Pier 79, 2008, pp. 23-38, and is cited as disclosing a design of a dual-polarized ultra wideband horn antenna.*
Akgiray et al., "Ultrawideband square and circular quad-ridge horns with near-constant beamwidth", IEEE International Conference on Ultra-Wideband, Sep. 2012, pp. 518-522.*
Liu et al., "Research and Design of Quadruple-Ridged Horn Antenna", Progress in Electromagnetics Research Letters, vol. 37, Jan. 2013, pp. 21-28, and is cited as disclosing a design of dual-linear-polarized broadband horn antenna for 6-18 GHz frequency band.*
Akgiray et al., "Circular Quadruple-Ridged Flared Horn Achieving Near-Constant Beamwidth Over Multioctave Bandwidth: Design and Measurements", IEEE Transactions on Antennas and Propagation, vol. 61, Issue 3, Mar. 2013, p. 1099-1108.*

* cited by examiner

*Primary Examiner* — Omar Fernandez Rivas
*Assistant Examiner* — Herng-Der Day
(74) *Attorney, Agent, or Firm* — Steinfl + Bruno, LLP

(57) ABSTRACT

Novel methods and systems for antenna design are disclosed. A quadruple-ridged flared horn antenna can be designed based on geometry and frequency requirements. Automated optimization allows the design of antennas with decade-bandwidth. Optimized quadruple-ridged flared horn antennas can be used for radio astronomy.

9 Claims, 6 Drawing Sheets

$$\Gamma_{err}(f_i) = 20\log_{10}|\Gamma_{sim}(f_i)| + 10 \qquad \text{205}$$

$$SWR_{err}(f_i) = SWR_{sim}(f_i) - 2 \qquad \text{210}$$

$$\Gamma_{err-mean} = \frac{1}{N}\sum_{i=1}^{N}\Gamma_{err}(f_i) \qquad \text{215}$$

$$\Gamma_{err-max} = \max[\Gamma_{err}(f_i)] \qquad \text{220}$$

$$\mathbf{SWR}_{err} = SWR_{err}(f_i) \text{ for } i = 1,\ldots,M \qquad \text{225}$$

$$\eta_{err}(f_i) = 55\% - 100 \times \eta_{sim}(f_i) \qquad \text{230}$$

$$g(\theta) = \cos^q\theta \text{ with } q = \frac{ET}{20\log_{10}(\cos\theta_s)}. \qquad \text{235}$$

FIG. 2

$$\text{PWR}_{err-E} = \frac{\int_0^{\frac{\pi}{2}} E_{sim}(\theta)|_{\phi=0°} \sin\theta d\theta}{\int_0^{\frac{\pi}{2}} g(\theta) \sin\theta d\theta} \quad \text{— 305}$$

$$\text{PWR}_{err-H} = \frac{\int_0^{\frac{\pi}{2}} E_{sim}(\theta)|_{\phi=90°} \sin\theta d\theta}{\int_0^{\frac{\pi}{2}} g(\theta) \sin\theta d\theta} \quad \text{— 310}$$

$$C = \begin{bmatrix} \Gamma_{err-mean} \\ \Gamma_{err-max} \\ \text{SWR}_{err} \\ \eta_{err} \\ \text{PWR}_{err-E} \\ \text{PWR}_{err-H} \end{bmatrix} \quad \text{— 315}$$

FIG. 3

METHODS FOR DESIGNING QUADRUPLE-RIDGED FLARED HORN ANTENNAS

CROSS REFERENCE TO RELATED APPLICATIONS

The present application claims priority to U.S. Provisional Patent Application No. 61/846,510, filed on Jul. 15, 2013, the disclosure of which is incorporated herein by reference in its entirety.

STATEMENT OF INTEREST

This invention was made with government support under Grant No. AST0431486 awarded by the National Science Foundation. The government has certain rights in the invention.

TECHNICAL FIELD

The present disclosure relates to radio antennas. More particularly, it relates to methods for designing quadruple-ridged flared horn antennas.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 2 illustrates some equations of the numerical algorithm of FIG. 1.

FIG. 3 illustrates some equations of the numerical algorithm of FIG. 1.

SUMMARY

In a first aspect of the disclosure, a method to design an antenna is described, the method comprising: providing, by a computer, initial values for an antenna geometry; providing, by a computer, a desired frequency range for the antenna; providing, by a computer, a subtended angle for the antenna; performing, by a computer, an electromagnetic simulation for the antenna, based on the initial values for the antenna geometry, the desired frequency range and the subtended angle, thereby obtaining scattering parameters and far-field patterns for the antenna; evaluating, by a computer, a cost function for the antenna, based on the scattering parameters, the far-field patterns and the antenna geometry; determining an optimized design for the antenna, based on the initial values for the antenna geometry, the desired frequency range, the subtended angle, the scattering parameters, the far-field patterns and the cost function, thereby obtaining an optimized antenna.

DETAILED DESCRIPTION

Among the branches of astronomy, radio astronomy is unique in that it spans the largest portion of the electromagnetic spectrum, e.g., from about 10 MHz to 300 GHz. On the other hand, due to scientific priorities as well as technological limitations, radio astronomy receivers have traditionally covered only about an octave bandwidth. This approach of "one specialized receiver for one primary science goal" is, however, not only becoming too expensive for next-generation radio telescopes comprising thousands of small antennas, but also is inadequate to answer some of the scientific questions of today which require simultaneous coverage of very large bandwidths.

Significant improvements towards decade-bandwidth radio astronomy can be achieved through the use of reflector feed antennas and low-noise amplifiers on compound-semiconductor technologies.

The present disclosure introduces methods for designing quadruple-ridged flared horn antennas (QRFH antennas). These antennas are flexible, dual linear-polarization reflector feed antennas that can achieve 5:1-7:1 frequency bandwidths while maintaining near-constant beamwidth. The horn of such antennas are wideband feed antenna suitable for radio astronomy that can be designed to have nominal 10 dB beamwidth between 30 and 150 degrees. In some embodiments, such antennas only require one single-ended 50Ω low-noise amplifier per polarization.

Figure 1:
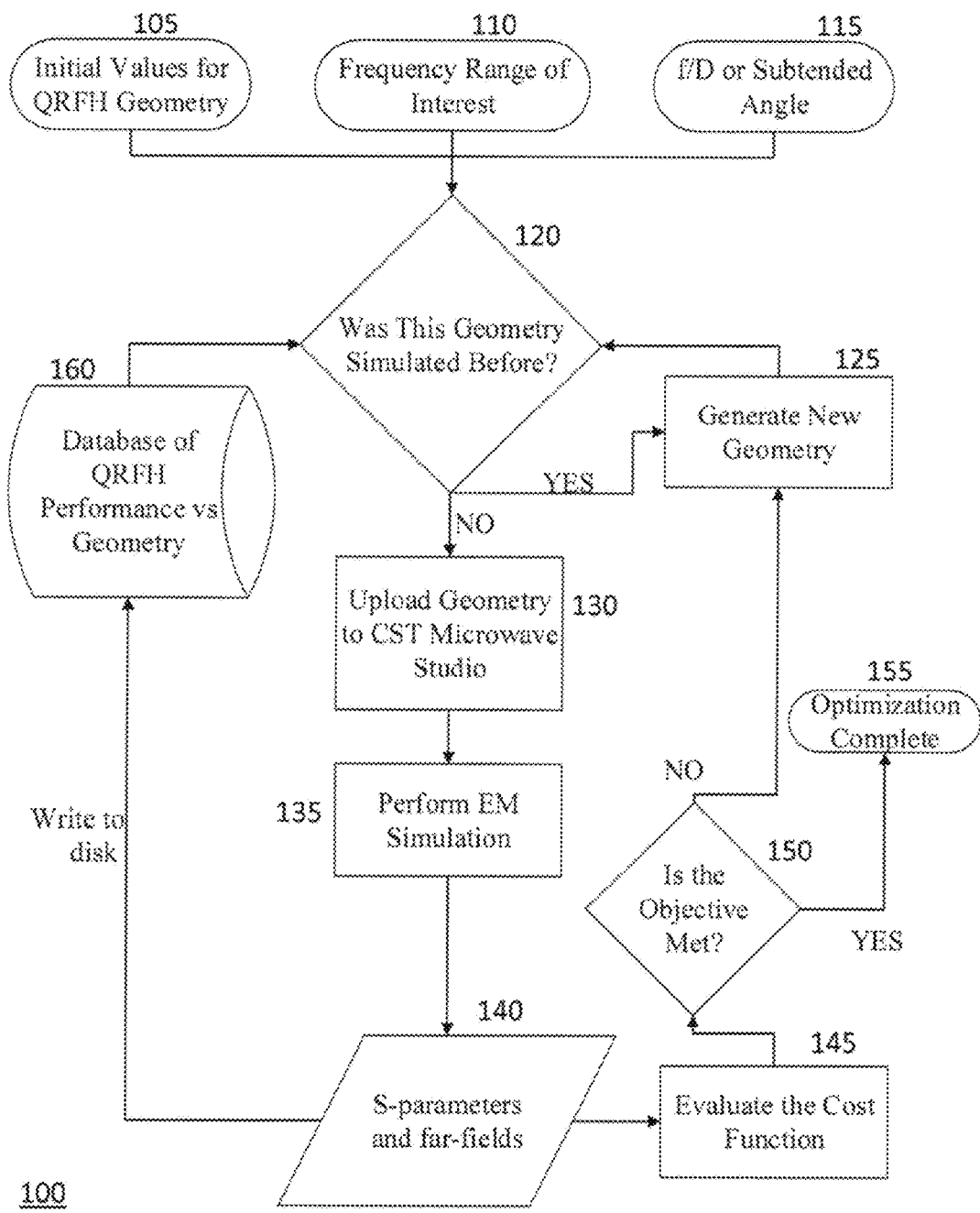
FIG. 1 illustrates one embodiment of a numerical optimization algorithm used to design quadruple-ridged flared horn antennas.

FIG. 1 illustrates one embodiment of a numerical optimization algorithm (100) used to design quadruple-ridged flared horn antennas. Due to a lack of theoretical framework, these antennas must be designed by numerical electromagnetic (EM) simulations. By following the methods of the present disclosure, a physical antenna with specific physical parameters can be designed and fabricated. The methods of the present disclosure can accelerate and facilitate unattended simulations and optimization. The methods of the present disclosure can be implemented, for example, through a number of scripts written in MATLAB to communicate with the electromagnetic solver CST Microwave Studio (MWS) via Matlab's COM and CST's Visual Basic interfaces.

The geometry of a QRFH antenna is defined by a number of parameters such as angles and distances, as can be understood by the person skilled in the art. In the optimization algorithm (100) of FIG. 1, the initial values (105) for such a geometry can be provided by a user. The geometry of an antenna may comprise parameters for its sidewalls and for its ridges.

A frequency range of interest (110) can also be provided. The f/D parameters, where D is the least distance of distinct vision and f is the focal length, or the subtended angle (115), can also be provided.

Therefore, the first steps in the optimization comprise providing the initial set of parameters defining the problem: 1. the starting QRFH geometry (105); 2. the frequency range of interest (110); and 3. the subtended angle to the primary (secondary) reflector (115).

Because multi-variable optimizations can span many dimensions, the user can also select the subset of the QRFH parameters to be used during optimization. This allows for evaluation of the most critical parameters as far as the performance of the antenna is concerned. To further expedite the process and reduce the number of "infeasible" geometries (i.e., those that would produce completely unacceptable results), the user can also supply a percentage range for each parameter (e.g., +/−10% for parameter X, +/−20% for Y, etc.).

In a subsequent step (120) of the optimization algorithm (100), the algorithm (100) searches through the existing database of QRFH simulations. In one embodiment, this part of the algorithm (100) runs in MATLAB, therefore it is MATLAB that searches through the existing database of QRFH simulations. In the following, an embodiment of the present disclosure will be described, wherein parts of the algorithm (100) are indicated as MATLAB to indicate that the algorithm (100) can be executed in MATLAB. The person skilled in the art will understand that such embodiment is an example embodiment, and the algorithm (100) may be implemented in different ways. In other embodiments, the 'MATLAB' term in the following example may be substituted with the more generic term 'algorithm'. Other parts of the algorithm (100) in the following example are implemented in CST MWS. Similarly, as understood by the person skilled in the art, such parts of algorithm (100) may be implemented in different ways, and the more generic term 'algorithm' may be substituted below for 'CST MWS'.

Step (120) ensures the initial QRFH geometry input (105) by the user has not been simulated previously. If the geometry (105) has been simulated previously, a new set of parameters is generated (125) so that each simulated geometry is unique. The new set of parameters (125) can be generated by MATLAB within a variation range specified by the user for each parameter. The particular details of how MATLAB arrives at the new parameter set can be dependent on the optimization engine. Once a unique parameter set is found, MATLAB uploads the profiles of the ridges and the sidewall (130), separately to CST MWS in the form of x-y coordinates. The CST model file built specifically for the QRFH antenna can then take the geometry coordinates and build the 3-D structure. The electromagnetic (EM) simulation (135) is then started.

Upon completion of the EM simulation (135), MATLAB commands CST to write scattering parameters (S-parameters) and far-field patterns (140) to disk for archiving (160). The data set can also simultaneously (or subsequently) be read into MATLAB to calculate the optimization cost function (145). The cost function may comprise the input reflection coefficient, aperture efficiency, and ratio of power in the main beam of a cos-Q pattern of a given edge taper to that of the simulated patterns. The cost function can be manually tailored for each target application. For instance, some applications may require very stringent spillover control, in which case the cost function may emphasize noise temperature over aperture efficiency. In some other cases, spillover may be of less concern in which case the aperture efficiency may be given more weighting.

Several terms which may be included in the cost function are detailed in the following.

Input Reflection Coefficient

In general, the target input return loss may be 10 dB or higher for QRFH antennas. The input reflection coefficient can be calculated from the scattering parameters results obtained from CST (it is given by S11 and/or S22). This error is represented by three terms (or three errors). Referring to FIG. 2, the return loss error can be defined (205). In equation (205), $\Gamma_{sim}(f_i)$ is the simulated reflection coefficient as a function of discrete frequency $f_i$. The standing-wave ratio error can be defined as in equation (210), where $SWR_{sim}(f_i)$ is the standing-wave ratio as a function of discrete frequency $f_i$. In equations (205) and (210), the +10 and −2 terms on the right-hand sides are present for the case where goal for the return loss optimization is equal or greater than 10 dB (equivalent to SWR=2). A different constant factor may be defined for a different goal for the return loss optimization, as understood by the person skilled in the art.

The errors (205, 210) can be stored in vector format in MATLAB and all the negative error terms can be discarded. The discrete frequency $f_i$ is the set of frequencies at which CST calculates the scattering parameters (for a total of N points). This set of frequencies is always larger than the number of frequencies at which far-field patterns are calculated. Furthermore, the errors (205, 210) can be calculated, for example, only in the frequency range of interest for the antenna. For example, for an antenna target frequency range of 2-12 GHz, the CST frequency range may usually be about 1.5-15 GHz. However, in some embodiments, for this example, the errors are only calculated for frequencies between 2 and 12 GHz.

In some embodiments, the third error parameter taken into consideration is simply the maximum error for the return loss error (205).

Therefore, the three terms in the cost function proportional to the reflection coefficient are, in some embodiments, defined by equations (215, 220, 225) in FIG. 2.

In FIG. 2, the first parameter (215) penalizes deviations of the average simulated return loss from the target 10 dB level. Similarly, the second parameter (220) penalizes deviations of the maximum simulated return loss. The last parameter (225) can be included because of a special feature of the QRFH antennas. In particular, the quad-ridged horn return loss may decrease very rapidly at the low end of its frequency range due to waveguide cutoff. When this happens, return loss approaches 0 dB relatively "slowly." On the other hand, the standing-wave ratio may increase very rapidly (in the limiting case where return loss=0, SWR=infinity). Therefore, this last error parameter (225) ensures that the input return loss is as close to the desired level as possible at the low end of the QRFH frequency range.

Aperture Efficiency/Figure-of-Merit

The simulated aperture efficiency, $\eta_{sim}$, can be calculated per the equations in Section 2.2 of the PhD thesis of A. Akgiray, "New Technologies Driving Decade-Bandwidth Radio Astronomy: Quad-Ridged Flared Horn & Compound-Semiconductor LNAs" (Caltech, 2013), the disclosure of which is incorporated herein by reference in its entirety. These equations are approximations and the results obtained from them can be used in a relative sense (e.g., to compare one simulation to another). The aperture efficiency error can be given as the equation (230) in FIG. 2. In equation (230), the discrete frequency $f_i$ represents the frequencies at which radiation patterns are calculated.

As mentioned above, sometimes it's desirable to not use aperture efficiency as one of the optimization criteria. Instead, a figure-of-merit (FoM) can be used, which as understood by the person skilled in the art, can often be defined as $$FoM = \frac{\eta_{sim}}{T_{sys}}$$

where $T_{sys}$ is an approximate system noise temperature. Because the equations described above are used in a relative sense (as explained above), the figure-of-merit is normalized prior to use in the cost function. In particular, the simulated efficiency can be normalized by (i.e., divided by) the target efficiency, that is 55% in some embodiments. The normalized system noise temperature can be given by $$T_{sys} = \frac{(1-\eta_{spill,sim})150+15}{(1-0.96)150+15}$$

where $\eta_{spill,sim}$ is the simulated spillover efficiency (as described in Section 2.2 of the PhD thesis referenced above) and it is assumed that half of the spillover energy is radiated into cold sky (0 Kelvin) and the other half "sees" the 300 Kelvin Earth (in which case the average temperature "seen" by the spillover energy is approximately 150 Kelvin). Here, the target spillover efficiency is 96%, which may be changed depending on the application.

Comparison to cos-Q patterns

Another efficiency error term in the cost function may compare the simulated radiation patterns to the ideal cos-Q pattern in the E- and H-planes. The user defines the desired edge taper, ET, at the half subtended angle $\theta_s$ and from this, the cos-Q pattern is easily obtained, for example as in equation (235) of FIG. 2. The cos-Q pattern can then be integrated to get the "total power" and compared with the integral of the simulated patterns in the E- and H-planes, for example as in equations (305) and (310) in FIG. 3.

Some purposes of these terms are to ensure that not only the simulated edge taper (this is intimately related to spillover) approaches the desired value, but also to avoid nulls and large ripples in the main beam. The final cost vector can then be given, for example, by equation (315) in FIG. 3.

The final cost vector (315), as seen in FIG. 3, may comprise parameters (215, 220, 225, 230) from FIG. 2, as well as parameters (305, 310) from FIG. 3.

Referring to FIG. 3, some parameters of vector (315) may comprise vector quantities dependent on frequency, as understood by the person skilled in the art. Once the cost function (315) is evaluated, MATLAB can resume the optimization, such as in algorithm (100) in FIG. 1, until design objectives are met (which may never happen so the optimization can run until the user interrupts it).

Three built-in MATLAB optimization routines may be used, for example, in the methods of the present disclosure, namely lsqnonlin, GlobalSearch, simulannealbnd. The first is the default non-linear least-squares optimizer in MATLAB. It has the advantage of estimating the Jacobian of the cost function with respect to the optimization variables thereby "learning" to predict how a given change in one parameter will affect the cost function. One disadvantage, however, may be that it can easily converge to and get stuck in a local minima, which may limit its use in some embodiments. The last two routines (GlobalSearch, simulannealbnd) are part of Matlab's global optimization toolbox. In some applications, the rate of convergence of the simulated annealing algorithm may be slow; however, it can automatically restart the optimizer with a randomly generated parameter set after a prescribed number of iterations. This may result in better coverage of the parameter space and may yielded several QRFH geometries.

In some embodiments, the automated methods of the present disclosure may be implemented on a dedicated workstation with a graphics processing unit (GPU).

Figure 4:
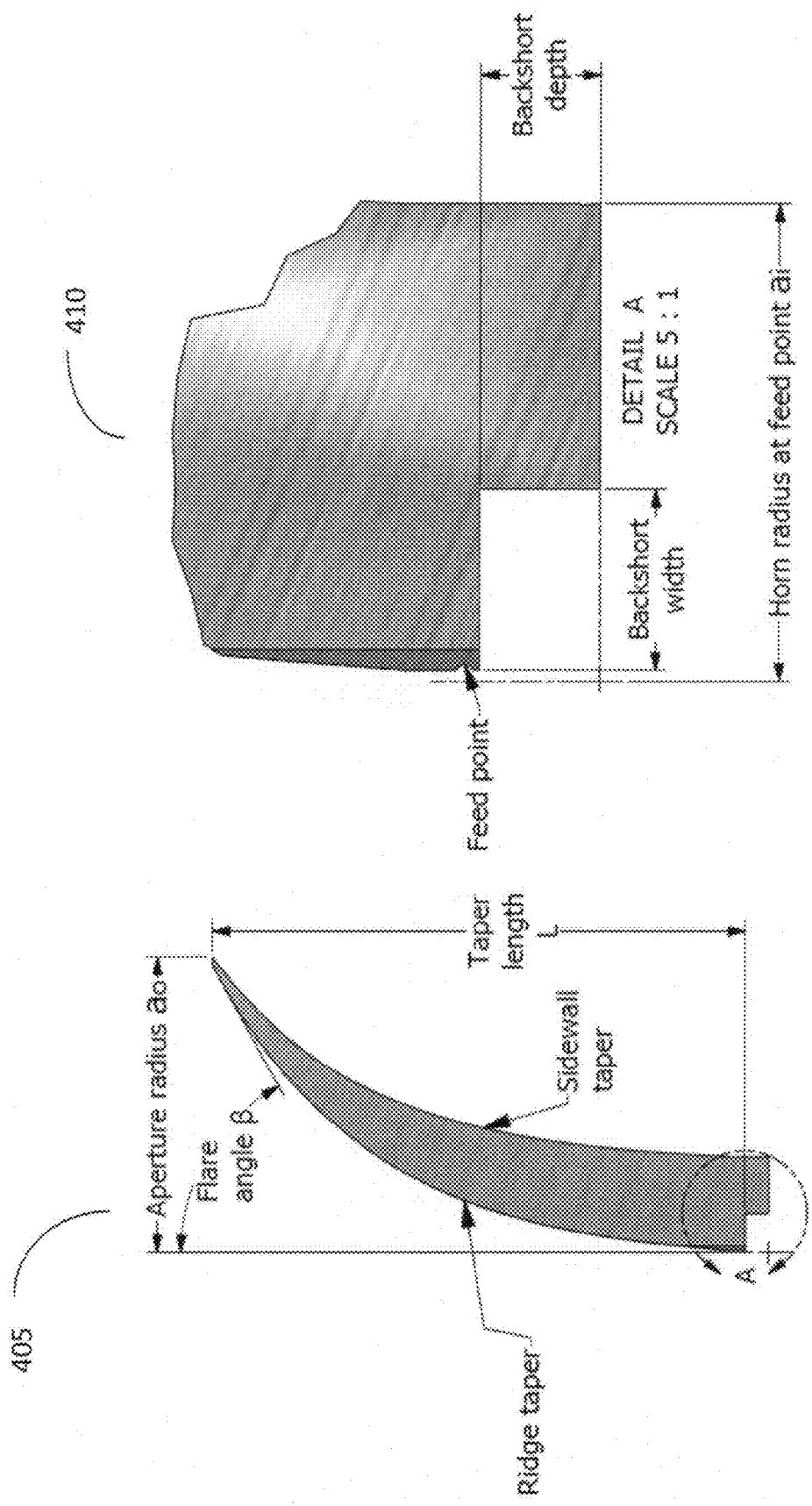
FIG. 4 illustrates exemplary ridges and sidewalls of an antenna.

The quad-ridged horn geometry of a QRFH antenna may be represented by several parameters. In some embodiments, about 15 parameters may be employed. Some of the possible parameters are illustrated in FIG. 4. These parameters will be understood by the person skilled in the art. Referring to FIG. 4, some parameters may refer to the ridges, such as ridge (405) of a QRFH antenna. Other parameters may refer to a sidewall (410) of a QRFH antenna.

Figure 5:
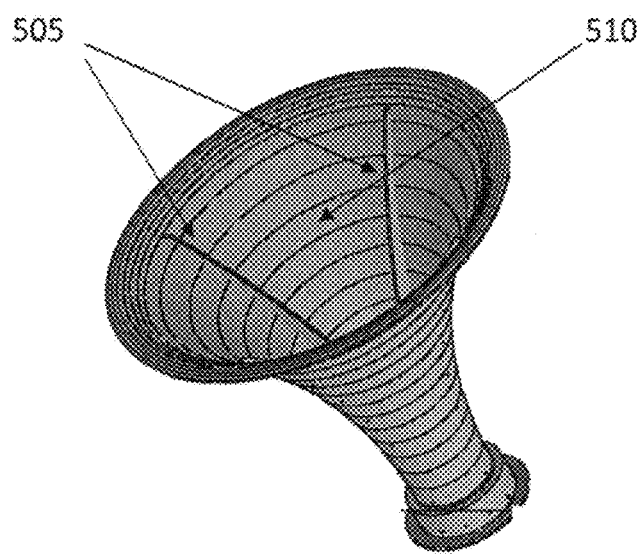
FIG. 5 illustrates an exemplary embodiment of the QRFH antennas of the present disclosure.

FIG. 5 illustrates an exemplary embodiment of the QRFH antennas of the present disclosure. Other geometries may be used, for example rectangular instead of circular. Referring to FIG. 5, ridges (505) and sidewalls (510) are visible.

The person skilled in the art will understand that the methods described in the present disclosure may be used to design other types of antennas, for example with a different number of ridges.

Figure 6:
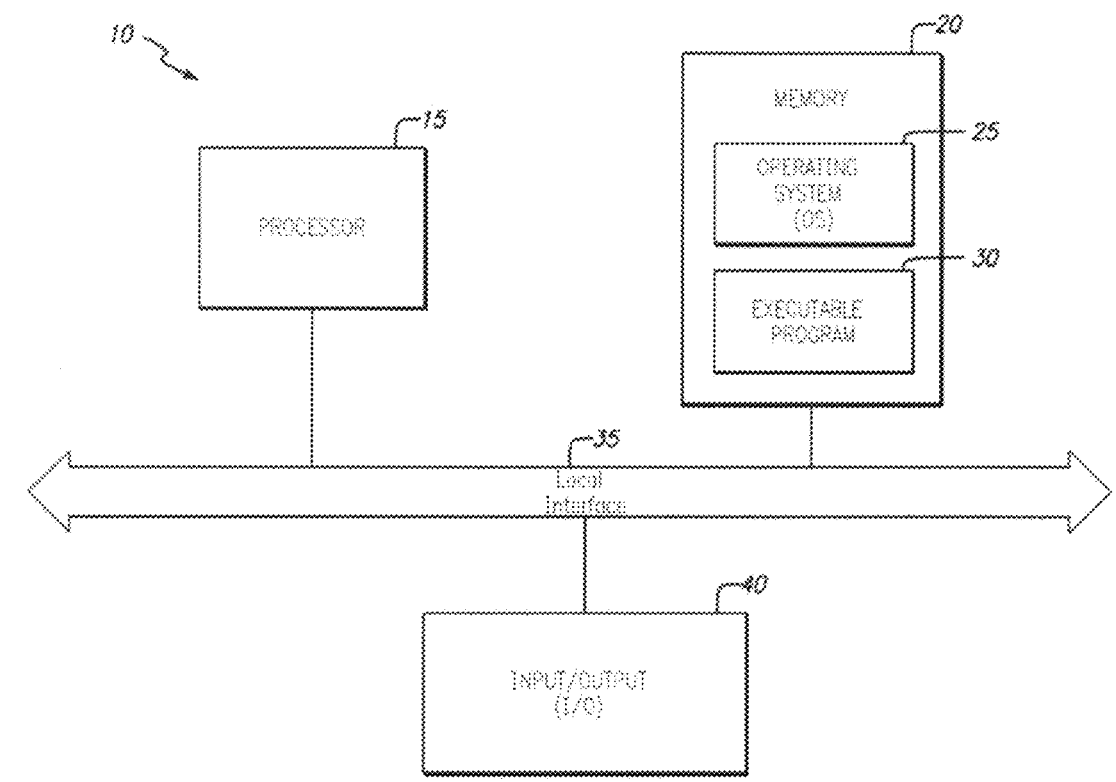
FIG. 6 depicts an exemplary embodiment of a target hardware for implementation of an embodiment of the present disclosure.

FIG. 6 is an exemplary embodiment of a target hardware (10) (e.g., a computer system) for implementing the embodiment of FIGS. 1 to 5. This target hardware comprises a processor (15), a memory bank (20), a local interface bus (35) and one or more Input/Output devices (40). The processor may execute one or more instructions related to the implementation of FIGS. 1 to 5, and as provided by the Operating System (25) based on some executable program (30) stored in the memory (20). These instructions are carried to the processor (15) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, inputting data and/or commands from a touchscreen, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 6. In some embodiments a plurality of processors may be used in a parallel configuration for added execution speed. In such a case, the executable program may be specifically tailored to a parallel execution. Also, in some embodiments the processor (15) may execute part of the implementation of FIGS. 1 to 5, and some other part may be implemented using dedicated hardware/firmware placed at an Input/Output location accessible by the target hardware (10) via local interface (35). The target hardware (10) may include a plurality of executable programs (30), wherein each may run independently or in combination with one another.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM).

The instructions may be executed by a processor (e.g., a digital signal processor (DSP), an application specific integrated circuit (ASIC), a field programmable logic array (FPGA), a graphic processing unit (GPU) or a general purpose GPU).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A method to design an antenna, the method comprising:
   providing, by a computer, initial values for an antenna geometry;
   providing, by a computer, a desired frequency range for the antenna;
   providing, by a computer, a subtended angle for the antenna;
   performing, by a computer, an electromagnetic simulation for the antenna, based on the initial values for the antenna geometry, the desired frequency range and the subtended angle, thereby obtaining scattering parameters and far-field patterns for the antenna;
   evaluating, by a computer, a cost function for the antenna, based on the scattering parameters, the far-field patterns and the antenna geometry;
   determining an optimized design for the antenna, based on the initial values for the antenna geometry, the desired frequency range, the subtended angle, the scattering parameters, the far-field patterns and the cost function, thereby obtaining an optimized antenna,
   wherein the cost function comprises an input reflection coefficient, the input reflection coefficient comprising a return loss error, a standing-wave ratio, and a maximum error for the return loss error.

2. The method of claim 1, wherein the cost function further comprises an aperture efficiency.

3. The method of claim 1, wherein the cost function further comprises a ratio of power in a main beam of a cos-Q pattern.

4. The method of claim 3, wherein the cost function further comprises an aperture efficiency.

5. The method of claim 4, wherein the antenna is a quadruple-ridged flared horn antenna.

6. The method of claim 3, wherein the cost function further comprises a figure of merit.

7. The method of claim 1, wherein the cost function further comprises a figure of merit.

8. The method of claim 4, wherein the antenna is a quadruple-ridged flared horn antenna.

9. The method of claim 8, wherein a cross section of the antenna is substantially circular or square.

* * * * *